Figure 1:
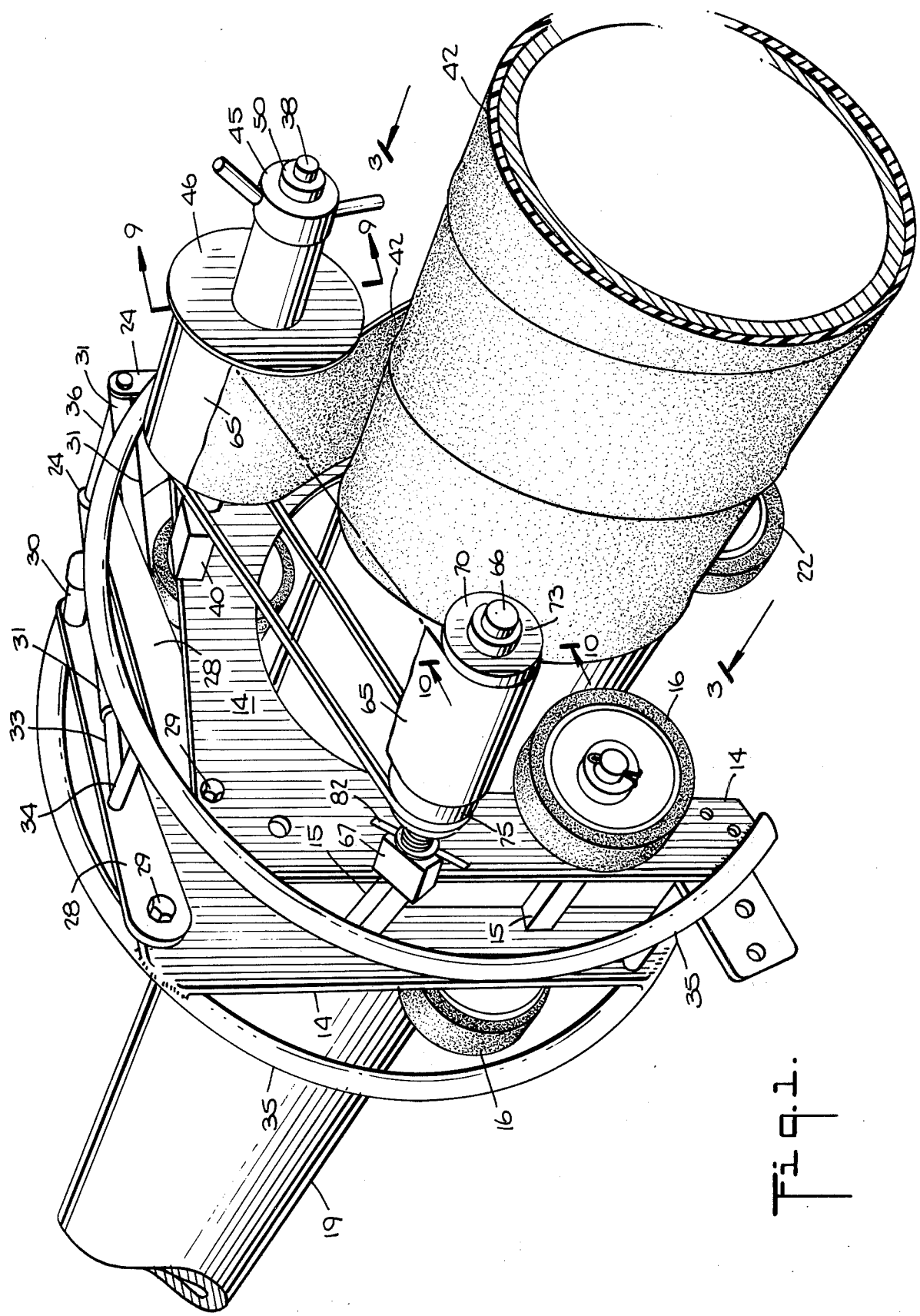
Figure 2:
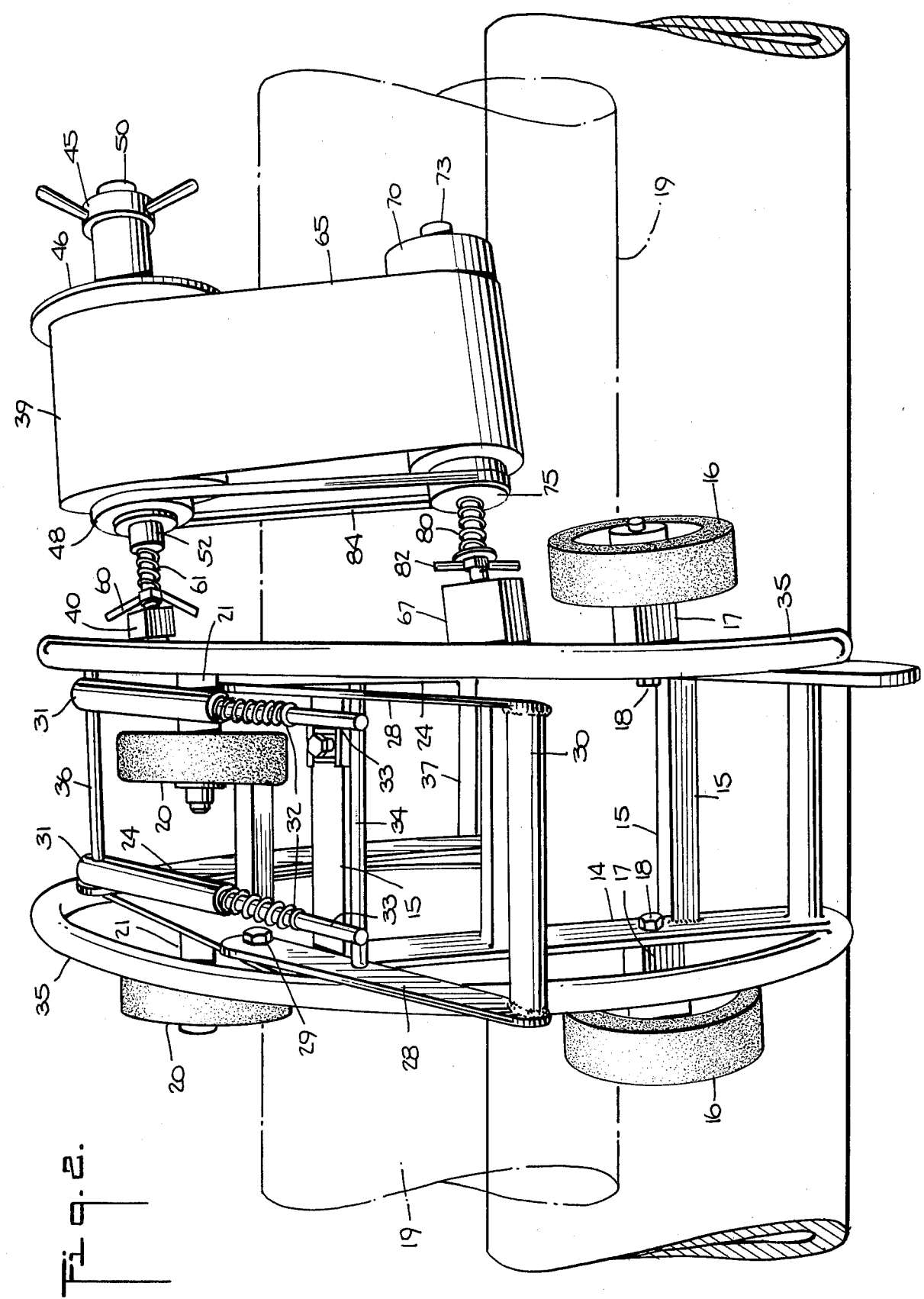
Figure 3:
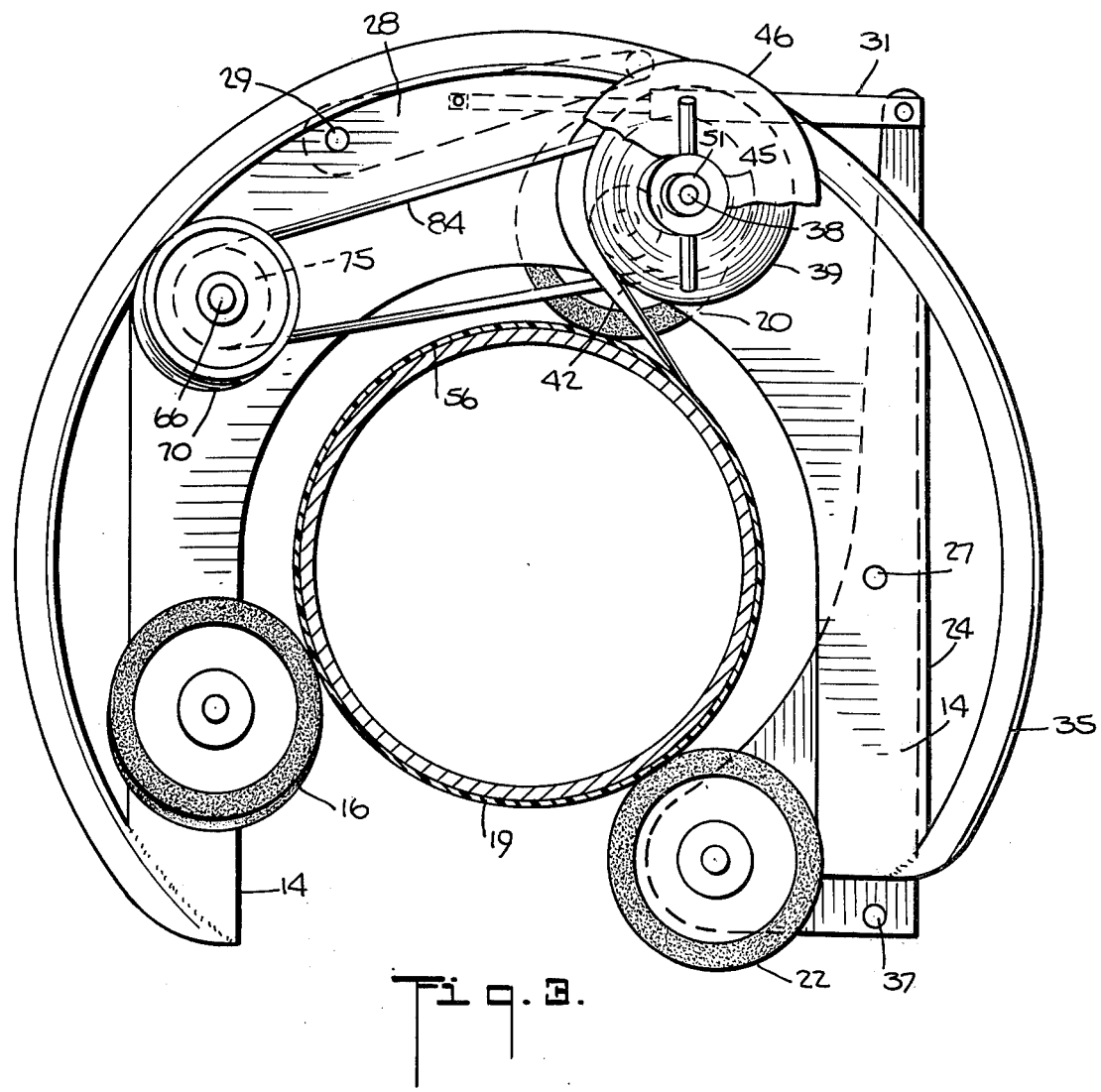

United States Patent [19]

Stuart, Jr. et al.

[11] 4,125,422
[45] Nov. 14, 1978

[54] PIPE WRAPPING MACHINE

[75] Inventors: Linden Stuart, Jr., Chester, N.J.; Harry R. Davis, Lost Creek, W. Va.

[73] Assignee: Stuart Steel Protection Corporation, South Bound Brook, N.J.

[21] Appl. No.: 834,999

[22] Filed: Sep. 20, 1977

[51] Int. Cl.² ............................................. B29H 17/00
[52] U.S. Cl. ................................................... 156/394
[58] Field of Search .......................................... 156/392

[56] References Cited

U.S. PATENT DOCUMENTS

| | | | |
|---|---|---|---|
| 2,340,326 | 2/1944 | Horrigan | 156/392 |
| 3,547,731 | 12/1970 | Stuart, Jr. et al. | 156/392 |
| 4,058,427 | 11/1977 | Wilson | 156/392 |

Primary Examiner—Douglas J. Drummond
Attorney, Agent, or Firm—Kenyon & Kenyon et al

[57] ABSTRACT

A portable pipe wrapping machine is provided wherein a pipe enveloping frame which is rotatably supported concentrically with respect to a pipe comprises a reel assembly that is mounted on the frame and that is adapted to receive and rotatably support a roll of wrapping material of the cold wrap type that has a separator sheet between adjoining plies of the roll in position for feeding wrapping material from the roll to the pipe to be wrapped about the pipe while rotating the frame about the pipe, a sheet receiving assembly being provided that is powered responsive to rotation of a roll of wrapping material comprised in the reel assembly, the pull-tension on the wrapping material as it is applied to the pipe being adjustable by adjustment of a friction brake and said sheet receiving assembly comprising a friction clutch that is adjustable to maintain the protector sheet under a predetermined pull-tension as it is stripped from said wrapping material and wound upon a windup spool. The axes of rotation of said roll and of said spool are adjustable relative to the frame of the machine and relative to each other.

10 Claims, 11 Drawing Figures

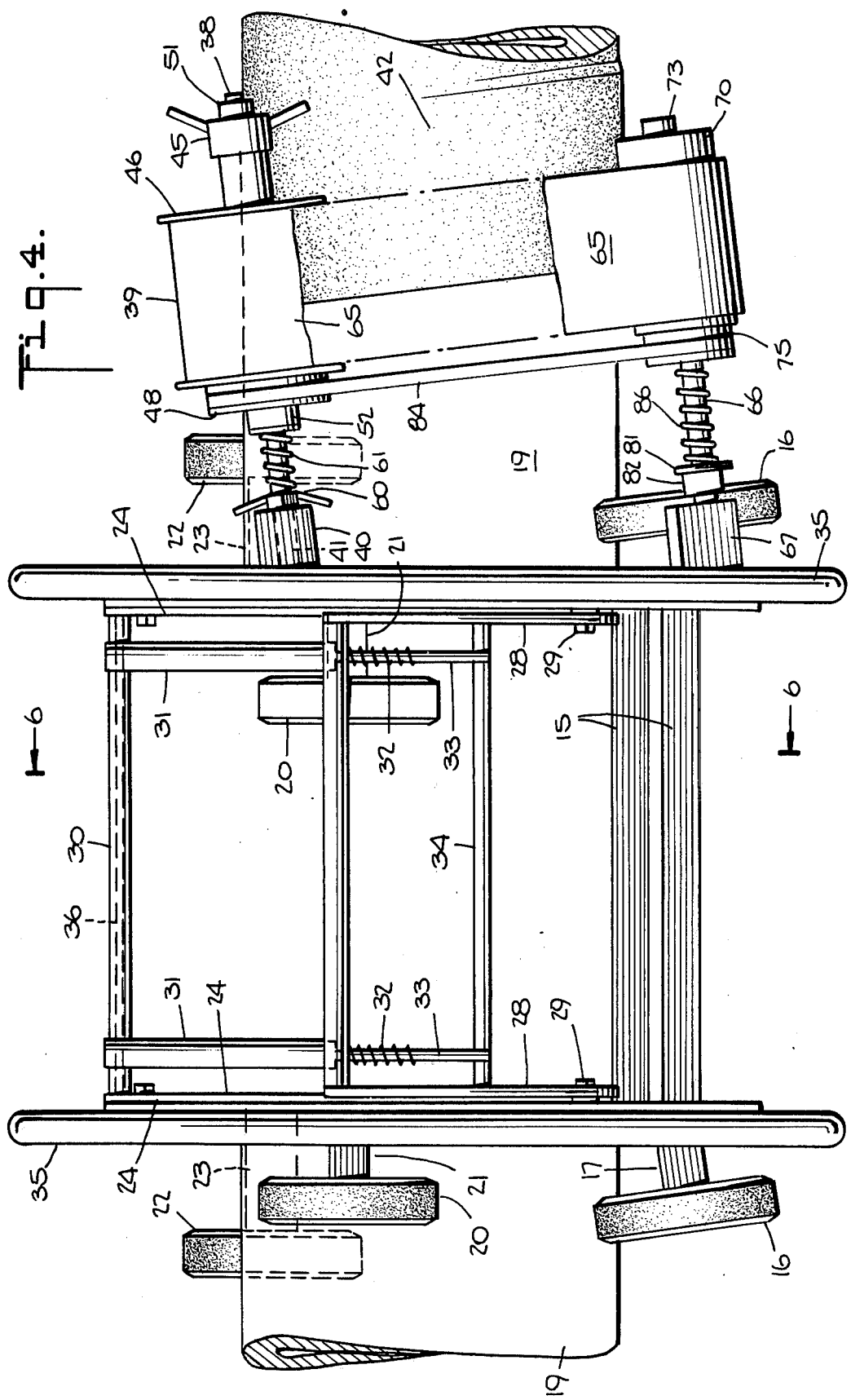

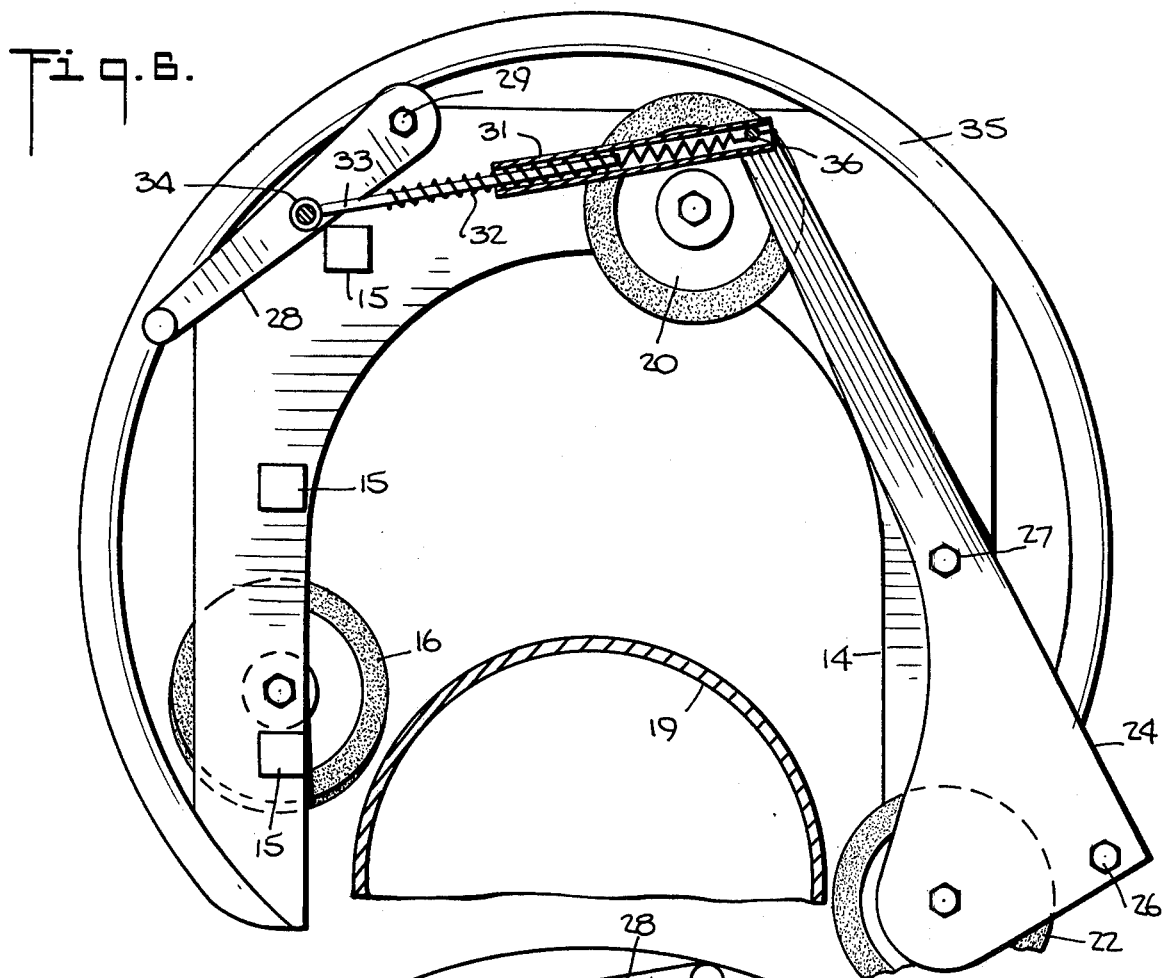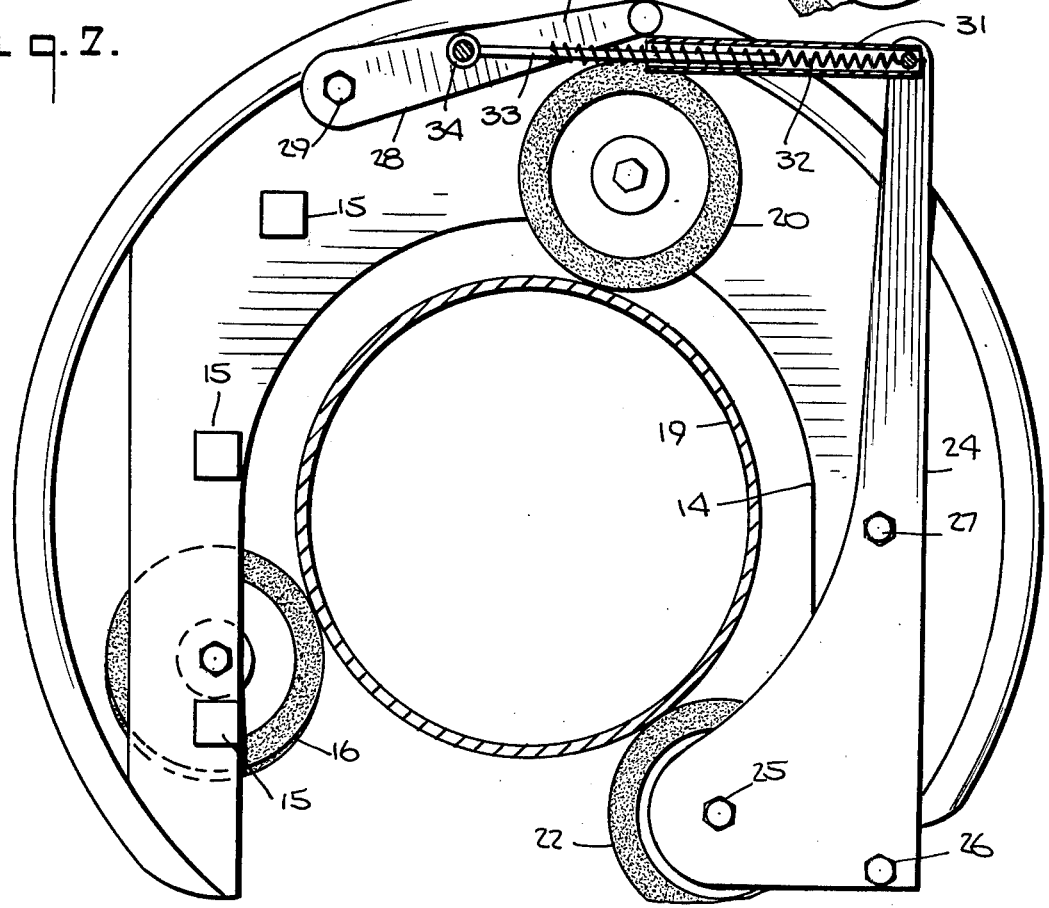

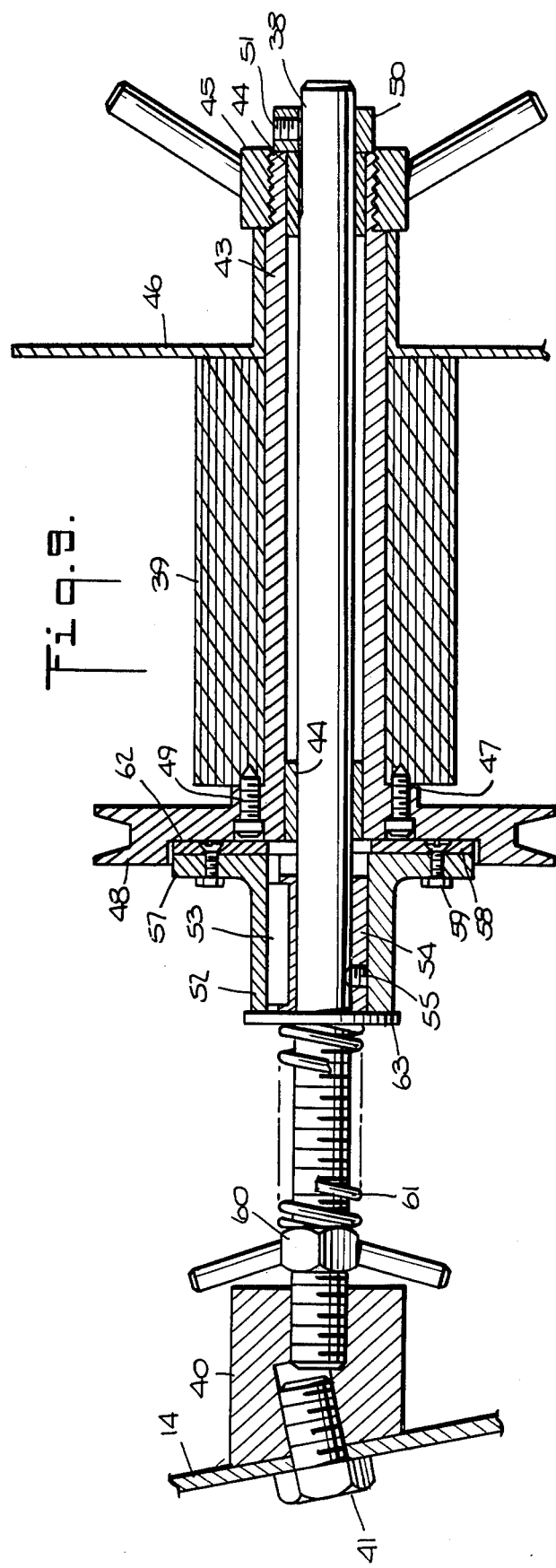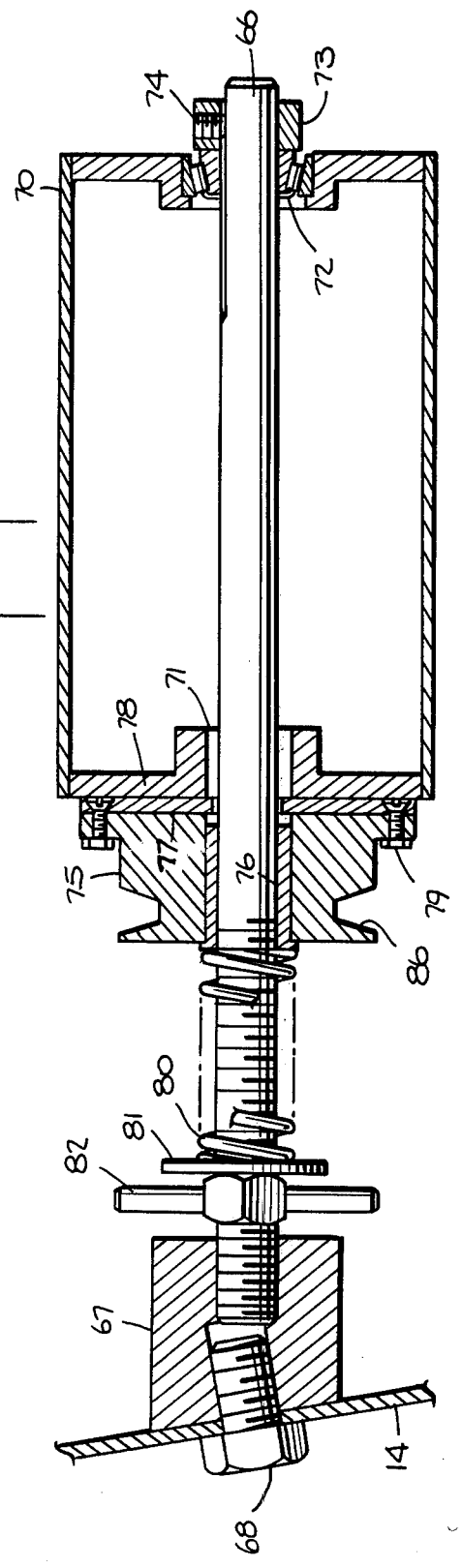

PIPE WRAPPING MACHINE

This invention relates to a pipe wrapping machine. More particularly this invention relates to a pipe wrapping machine for wrapping a protective strip of material about a pipe. More especially this invention relates to a portable pipe wrapping machine which is manually operable for wrapping a protective strip of material about a pipe.

BACKGROUND OF THE INVENTION

Pipe wrapping machines have heretofore been provided which are adapted to wrap various types of protective material about pipes either before shipment or in the field before or after placement. Some such pipe wrapping machines which heretofore have been used in the field have been of great bulk and weight and in certain cases have required propulsion by some appropriate power means. For the purpose of avoiding the necessity for using pipe wrapping machines of great bulk and weight it has been heretofore proposed to employ a pipe wrapping machine which may be readily handled and which may be placed in position in relation to a pipe manually. Two such portable and manually operable pipe wrapping machines are disclosed in the Stuart, Jr. et al U.S. Pat. Nos. 3,470,057 and 3,547,731. The portable pipe wrapping machines disclosed in these patents are characterized by a pipe enveloping frame having a pipe receiving mouth, locking means mounted on the frame for disposition across the pipe receiving mouth so as to retain a pipe within the frame and means mounted on the frame for rotatably supporting the frame concentrically with the pipe held within the frame. The pipe wrapping machines disclosed in these patents enable the operator to apply to a pipe a wrapping material of the type which requires the application of heat in order to make it adhere to the pipe surface and provide an effective protection against moisture and other corrosive influences contained in soil. For example, the wrapping material used in the pipe wrapping machines of the type referred to may be an asphalt-impregnated or tar-impregnated asbestos felt and an inner layer of glass fiber embedded in a material such as thermoplastic tar or asphalt which is sufficiently thermoplastic so as to be rendered adhesive by application of heat. Until the surface layer is rendered thermoplastic by the application of heat it is so lacking in adhesiveness that a strip of the wrapping material may be formed into a roll from which the wrapping material is fed for application to the surface of the pipe on which the pipe wrapping machine has been positioned. Because the surface layer is not thermoplastic or tacky until heated it is not necessary to employ a separator sheet between the plies of the wrapping material in the roll that is used in the machine. The machine of each of the patents includes means whereby sufficient heat may be applied to the strip of wrapping material to render the surface to be contacted with the pipe sufficiently thermoplastic and tacky to enable proper adhesion.

GENERAL DESCRIPTION OF THE INVENTION

It is an object of this invention to provide a portable manually operable pipe wrapping machine by which a strip of protective material may be applied to the surface of a pipe using a wrapping material of the cold wrap type which does not require the application of heat in order to effect its adhesion to a pipe and which is in form of a roll of the pipe wrapping material wherein adjoining plies of the roll are separated from each other by an intervening separator sheet.

It is a further purpose of this invention to provide a pipe wrapping machine of the character mentioned which comprises means for receiving and disposing of the separator sheet as it is stripped from the wrapping material during the travel of the wrapping material from the roll from which it is supplied to the surface of the pipe about which the wrapping material is being wrapped.

It is a further purpose of this invention to provide a pipe wrapping machine of the character mentioned which comprises means for adjustably predetermining the pull-tension imposed on the wrapping material as it is applied to a pipe and the pull-tension imposed on the separator sheet and is stripped from the wrapping material.

It is a further purpose of this invention to provide means for adjusting the angularity of the rotational axes of the roll of wrapping material and of a windup spool for the protector sheet relative to the frame of the machine and to each other.

The wrapping machine of this invention is of the type which utilizes a frame having a pipe receiving mouth, locking means mounted on the frame for disposition across the pipe receiving mouth to retain a pipe therein and means mounted on the frame for rotatably supporting the frame concentrically on a pipe. There is a reel assembly that is mounted on the frame and which is adapted for rotatably supporting a roll of the wrapping material in position to be payed out therefrom and wrapped about a pipe held within the frame during rotation of the frame about the pipe. As aforesaid the wrapping material is of the cold wrap type which because of the tackiness of the surface thereof that comes in contact with the pipe requires the placing of a protector sheet between the adjoining plies of the roll of wrapping material. The reel assembly comprises adjustable friction brake means for resisting the paying out of the wrapping material so that as the wrapping material is taken from the roll of wrapping material comprised in the reel assembly a predetermined amount of tension, adjusted as desired, is imposed on the wrapping material as it is being wrapped around the pipe thereby assisting in the attainment of the desired adhesion to the pipe surface.

In accordance with this invention a windup spool for winding up the protector sheet as it is stripped from the wrapping material is provided that is powered responsive to the rotation of a rotatable carrier for the roll of wrapping material with the interposition an adjustable friction clutch whereby a predetermined pull-tension may be applied to the protector sheet as it is stripped from the wrapping material and taken to the windup spool, the adjustability being such that said pull-tension may be imposed while at the same time enabling a predetermined amount of pull-tension to be maintained on the wrapping material as it is applied to the pipe.

The pipe wrapping machine of this invention is primarily designed for continuously applying a strip of wrapping material to a pipe in the form of a continuous overlapping spiral responsive to manual rotation of the frame of the machine about a pipe concentrically held therein with concomitant travel of the machine along the longitudinal extent of the pipe. The amount of travel per revolution is adjustable by mounting each wheel of one of the pairs of wheels by which the frame of the which pass through apertures in the frame members for receiving the threaded locking nuts 18, 18. The blocks 17, 17 are unsymmetrical in that the surface of each block which contacts the frame members is substantially out of alignment with the surface that faces each of the wheels 16, 16, the latter surface being normal respectively to the axes of the rotation of each of the wheels 16, 16. In this manner a mounting means is provided whereby the wheels 16, 16 as shown may be secured in place with their axes of rotation respectively at an angle with respect to the planes of frame members 14, the wheels 16, 16 being aligned with each other so that when the machine is rotated about the pipe 19 which has been introduced into and locked in place within the frame members it will be caused to move longitudinally with respect to the pipe 19. The aforesaid configuration of each of the blocks 17, 17 is such that when the blocks 17, 17 are rotated so as to change the rotational position of the face of the block abutting each frame member the angle of the axes of rotation of each wheel 16, 16 about its axle with respect to the frame members may be adjusted while maintaining the wheels aligned and thereby adjust the extent of travel along the pipe when the frame is rotated about the pipe.

The pair of wheels 20, 20 likewise is rotatably mounted in fixed relation with respect to the frame members 14 in that the wheels 20, 20 are rotatably carried by the blocks 21, 21, respectively, which may be secured to the frame members using threaded projections passing through apertures in the frame members for receiving locking nuts thereon as described hereinabove in connection with the securement of the blocks 17, 17. However, the mounting of the wheels 20, 20 in this instance is such that the axes of rotation of the wheels 20, 20 are substantially normal to the plane of the frame members to which they are respectively attached.

The third pair of wheels for rotatably mounting the frame members 14 concentrically with respect to a pipe within the frame members are comprised in a locking means mounted on the frame members for disposition across the pipe receiving mouths of the frame members or, alternatively, moved out of the way to permit passage of pipe through the mouths of the frame members. As best shown in FIGS. 3, 4, 6 and 7 each wheel of the pair of wheels 22, 22 is rotatably carried on one of the blocks 23, 23 that in turn are secured to the lower extremities respectively of the arms 24, 24 as by threaded extensions respectively passing through apertures in the arms 24, 24 for receiving locking nuts 25. The lower extremities of the arms 24, 24 are maintained in fixed relation to each other by means of a cross bar (not shown) which has a threaded extremity passing through each of the arms 24, 24 for receiving a locking nut 26. Each of the arms 24, 24 is pivotally mounted at 27 so as to permit the wheels 22, 22 to be swung out of the way for receiving the pipe 19 within the U-shaped frame members as shown in FIG. 6.

In the embodiment shown the manually actuatable means for moving the wheels 22, 22 into and out of position for locking the pipe 19 within the frame members comprises manually actuatable levers 28, 28 which are respectively secured in swingable relation with respect to the frame members 14 at 29, 29. The opposite extremities of the levers 28, 28 are secured together in spaced relation by the bar or rod 30 which is of convenient size to be manually grasped by the operator. The upper ends of the arms 24, 24 are respectively secured to the ends of a tie rod 36 to which are pivotally secured the ends of sleeve members 31, 31 which confine therewithin the compression springs 32, 32 that respectively partially surround the rods 33, 33 and that serve to urge the pair of wheels 22, 22 into position for locking the pipe 19 within the frame members, the rods 33, 33 being telescopically movable within the sleeves 31, 31. The rods 33, 33 are pivotally mounted with respect to the tie rod 34 the ends of which are secured to a mid-portion of each of the levers 28, 28. When the levers 28, 28 are moved to the position as shown in FIG. 6 by manual actuation from bar 30 the arms 24, 24 are moved out of the way so that the pipe wrapping machine may be manually placed in position over the pipe 19 by reception of the pipe through the pipe receiving mouths provided in the frame members. And when the parts are in this position in FIG. 6 it is also apparent that the pipe wrapping machine may be conveniently lifted from the pipe and removed. For convenience in manually accomplishing putting the machine in place on a pipe or removing it, a pair of C-shaped handles 35 are provided which may be secured to the respective frame members 14, 14 in any suitable way as by welding and which are positioned so as to permit the passage of pipe 19 through the mouths provided by the frame members. When the arms 24, 24 are moved to the position shown in FIG. 7, the spring load provided by the compression springs 32, 32 serves to maintain the wheels 22, 22 firmly in contact with the periphery of the pipe 19 so as to provide the third of the three pairs of wheels which are disposed about the pipe 19 at roughly the apices of a triangle for enabling the frame members 14, 14 to be manually rotated concentrically about the pipe 19 with the aid of the C-shaped handles 35.

Figure 11:
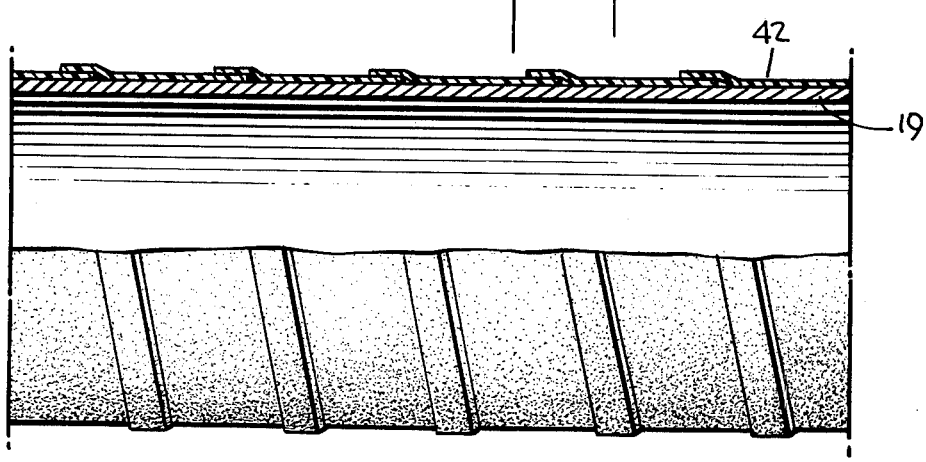

As stated hereinabove the purpose of the pipe wrapping machine is to wrap a strip of wrapping material 41 around the pipe 19 in the form of an overlapping spiral as shown in FIG. 11. The wrapping material that is employed in the practice of this invention is of the cold wrap type. Cold wrap wrapping material for wrapping pipes is well known and is obtainable from various manufacturers of such material. The wrapping material provides a protective waterproofing adherent covering and usually has a coal tar base with which some plasticizer is used for the purpose of preserving the plasticity of the wrapping material and providing tackiness which facilitates the adhesion of the wrapping material to the surface of the pipe during the wrapping operation. In order to improve upon the adhesion of the wrapping material to the pipe it is common practice to apply to the surface of the pipe a primer which is adapted to afford a solvent action on the surface of the wrapping material so as to make the surface of the wrapping material more adherent and more readily affixed in continuous waterproofing relation with respect to the pipe surface. Strips of cold wrap material are supplied in the form of rolls each roll containing a sufficient number of plies of the wrapping material to provide the spiral wrapping over a substantial length of pipe. Because of the tackiness of the cold wrap type of wrapping material it is the practice to interpose between each ply of the roll of wrapping material a thin separator sheet which serves the purpose of preventing the plies from sticking together in the roll. The separator sheet usually is quite thin and may be made of a variety of different materials, e.g., polyethylene or Teflon. Silicone treated paper also is used. The separator sheets take many different forms and may be made of many different materials but have the common attribute of serving as a thin separator sheet which must be stripped from the wrapping material when the wrapping material is applied to the surface of a pipe. The embodiment shown for illustrative purposes in the drawings provides an improved apparatus which comprises means whereby the wrapping material may be payed out from a roll of wrapping material of the character just mentioned and wound in the form of a spiral on a pipe while the wrapping machine travels along the pipe in combination with sheet receiving means for handling the protector sheet as it is stripped from the wrapping material when it is passed from the roll of wrapping material for application to the pipe surface.

Figure 9:
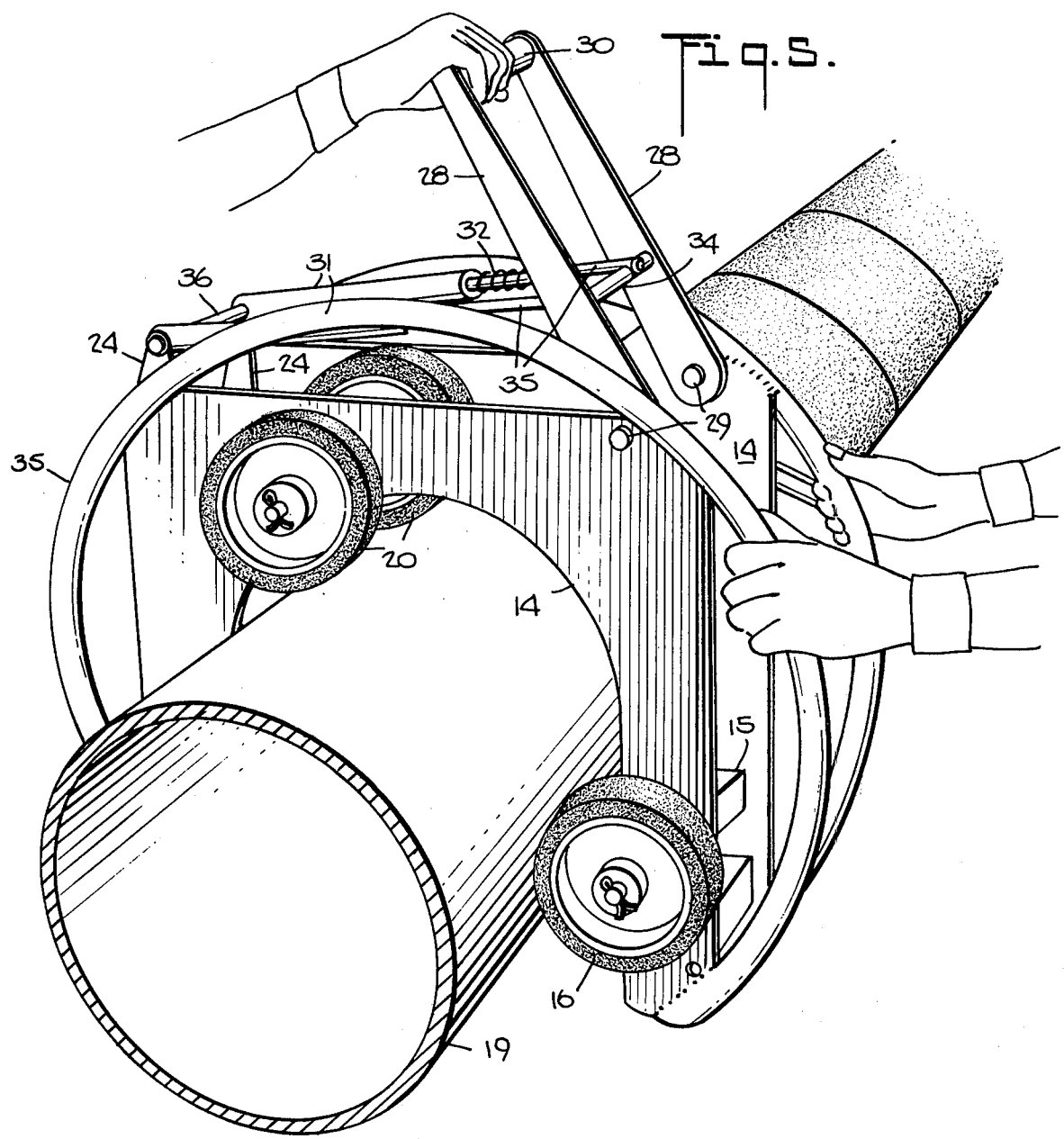

The reel means that is provided for use in accordance with this invention is adapted for receiving and rotatably supporting a roll of the wrapping material of the character above-mentioned wherein each of the plies of the wrapping material is separated from an adjoining ply by a protector sheet and for imposing adjustably a predetermined amount of tension on the wrapping material as it is unwound therefrom and wrapped about the pipe. More particularly, as best shown in FIG. 9, the reel means comprises an arbor 38 upon which a roll 39 of the wrapping material may be rotatably mounted. The arbor 38 is secured to one of the frame members 14 by a block 40 so that the angle that the axis of the arbor 38 makes with the plane of the frame member 14 to which it is secured may be adjusted in relation to the travel of the machine along the pipe as the frame of the machine is rotated about the pipe as such travel is determined by the positioning of the wheels 16, 16 as has been described hereinabove. To this end the block 40 is secured to the frame member as by a bolt 41 which passes through an aperture in the frame member into an internally threaded recess in the block. The bolt is disposed normally with respect to the face of the block in contact with the frame member 14 so as to permit angular adjustment of the block about the axis of the securing bolt 41. The arbor 38 in turn is secured to the block 40 with the axis of the arbor to a slight extent out of alignment with the axis of the bolt 41 which secures the block 40 to the frame member. With this arrangement the block 40 may be rotated about the axis of the securing bolt 41 with resultant adjustment in the angle that the arbor makes with reference to the plane of the frame member to which the block is secured by the bolt. In this manner the axis of the arbor 38 and in turn the axis of the roll 39 may be adjusted to desired position for paying out the wrapping material so as to provide the overlapping spiral wrapping as desired when the frame of the machine is manually rotated about the pipe with travel of the machine longitudinally with respect to the pipe. When the arbor has been adjusted to the desired position then the block may be held in fixed relation to the frame members 14 by tightening the securing bolt 41 for the block 40.

In the reel assembly, the roll 39 of wrapping material is carried on the roll carrier 43 for rotation about the arbor 38 on bearings 44. The external diameter of the roll carrier 43 is such that the inner diameter of the roll 39 just clears it so that the roll 39 may be readily moved to the position shown in FIG. 9 when the holding wing nut 45 and the flanged guide member 46 are removed. After the roll 39 has been placed on roll carrier 43, the guide member 46 and the winged holding nut 45 are also placed on the roll carrier 43 and when the winged holding nut is tightened to the position shown in FIG. 9 the end of the roll remote therefrom is pressed against the opposing face 47 of the pulley 48 with penetration therein of the ends of the holding bolts 49 that have pointed ends. In this way the roll 39, the roll carrier 43 and the pulley 48 rotate as a unit about the arbor 38 and they are maintained on the arbor 38 by the bearing ring 50 which is held on the arbor 38 by the set screw 51.

When the wrapping material 42 is payed out from the roll 39 it is preferable to subject the strip of wrapping material as it is wound about the pipe to a certain amount of pull-tension so as to accomplish a clean transfer from the roll to the pipe and so as to provide a desired amount of pressure contact as the wrapping material is deposited that improves the effectiveness of the adhesion of the wrapping material to the surface of the pipe. Any type of means for providing resistance to the unrolling of the roll 39 may be employed for the purpose of providing tension. In the embodiment shown the means for providing resistance to rotation of the roll 39 is provided by a spring loaded mechanism. The annular brake member 52 is keyed by key 53 for axial longitudinal movement relative to sleeve 54 which is held against rotation relative to the arbor 38 by the set screw 55. The end of the brake member 52 is flared to provide the annular flange 57 which is faced by the friction facing 58 that is held thereon by the holding nuts 59. The winged adjusting nut 60 is in threaded engagement with the arbor 38 and is adjustable in relation thereto and to the compressed spring 61 for adjusting the pressure imposed thereby against the washer 63 which is transmitted to the friction face 58 that is in friction contact with the opposing face 62 presented by the pulley 48. By adjusting the winged adjusting nut 60 to adjust the pressure exerted by the spring 61 the resistance to rotation of the roll 39 about the arbor 38 can be adjusted so as to thereby adjust the amount of pull-tension imposed on the wrapping material as it is wrapped about the pipe during rotation of the machine about the pipe. It is to be noted that the entire reel assembly including the winged adjusting nut 60 and the compression spring 61 is adjustable longitudinally relative to the arbor 38 as determined by the positioning of the set screws 51 and 55, this adjustability being additional to the above-described means for adjusting the angle that the longitudinal axis of the arbor makes with reference to the frame member 14.

Figure 4:
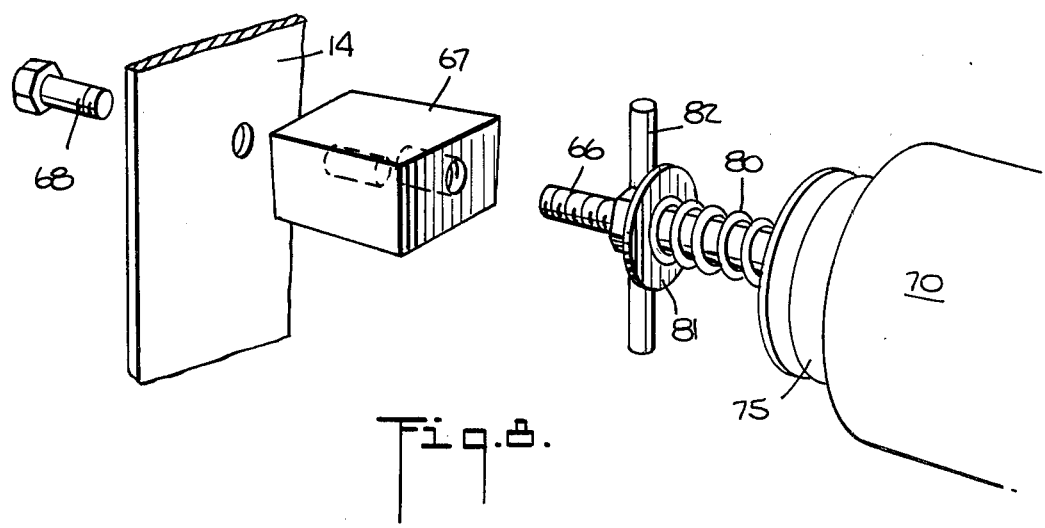

The sheet receiving means and the manner of its cooperation with the reel means hereinabove described is best shown in FIGS. 1, 4, 8 and 10. In the roll 39 the plies of wrapping material 42 are separated from each other by the protector sheet 65 which, while the wrapping material is being payed out, is stripped therefrom as best shown in FIGS. 1 and 4. The sheet receiving means comprises the mandrel 66 which is held in threaded engagement with the block 67 that in turn is secured to the frame member 14 by the bolt 68. The block 66 is similar in configuration to the block 40 which holds the arbor 38 of the reel means in secured relation to the frame member 14. The bolt 68 is disposed normally with respect to the face of the block in contact with the frame member 14 so as to permit angular adjustment of the block about the axis of the securing bolt 68. The mandrel 66 in turn is secured to the block 67 with the axis of the mandrel to a slight extent out of alignment with the axis of the bolt 68, the extent of an alignment preferably corresponding to the extent of nonalignment of the arbor 38 with respect to the axis of the bolt 41 by which the block 48 is secured to the frame. With this arrangement the block 67 may be rotated about the axis of the securing bolt 68 with resultant adjustment of the angle that the mandrel makes with reference to the plane of the frame member to which the block is secured, said plane being normal to the axis of rotation of the machine about the pipe. By conforming the configuration of the blocks 40 and 66, one is enabled to adjust the angle that the arbor makes with respect to the frame member and adjust the angle that the windup spool makes with the frame so that the axes of the arbor 38 and the mandrel 66 may be parallel during rotation of the pipe wrapping machine about the pipe thereby enabling the protector sheet to be wound up without difficulties due to creeping as the protector sheet is wound up and notwithstanding the adjustability of the arbor 38 for the roll of wrapping material and of the mandrel 66 for the sheet receiving means.

The windup spool 70 is mounted for rotation about the longitudinal axis of the mandrel 66 by means of bearings 71 and 72, the latter being in part a thrust bearing which bears against the roller 73 that is held in fixed relation to the mandrel 66 by the set screw. The end of the spool remote from the bearing 72 is controlled by the pulley 75 which is maintained for rotation about the mandrel 66 by the bearing 76 that is slidable longitudinally along the mandrel 66. The pulley 75 presents the clutch facing 77 that faces the end 78 of the spool and that is secured to the pulley by the screws 79. The pulley 75 including the clutch facing 77 is spring loaded for maintaining the clutch facing 77 in frictional contact with end 78 of the spool by means of the compression spring 80 that is disposed about the mandrel 66 between the bearing 76 and the washer 81 that is backed by the wing nut 82 that is in threaded engagement with the external threading on the mandrel. By adjusting the position of the nut 82 the extent of the frictional drag imposed on the spool 70 by the rotation of the pulley 75 may be adjusted as desired. It is to be noted that the windup assembly as a whole may be adjusted longitudinally with respect to the mandrel 66 by adjusting the position of the collar 73.

The belt 84 extends from the belt track 85 in the pulley 48 which is comprised in the roll carrier 43 that rotates as the wrapping material is unwound therefrom to the belt track 86 in the slip clutch pulley 75 by which the windup spool 70 is driven. The rate of rotation of the roll of wrapping material for a given rate of rotation of the wrapping machine about the pipe will increase as the diameter of the roll 39 becomes decreased. The diameters of the pulleys 48 and 75 are selected in relation to each other so for the maximum roll size that can be accommodated on the arbor 38 the pulley 75 will be caused to rotate at a speed such that the peripheral speed of the windup spool 70 will be greater than the rate at which the wrapping material is payed out from the roll 39 and by like token greater than the speed at which the protector sheet is stripped away for being wound up on the spool 70. Accordingly when the protector sheet 65 is being fed for windup on the spool 70 there will be a certain amount of frictional slippage between the clutch face 77 of the pulley 75 and the end face 78 of the spool 70. By adjustment of the adjusting wing nut 82 the degree of friction can be adjusted so as to enable the operator to adjust the pull-tension imposed by the windup spool in the separator sheet 65 in causing it to be stripped from the wrapping material and wound up on the windup spool. This relationship will be maintained throughout the unwinding of the roll 39 and regardless of irregularities in the rate at which the machine as a whole is rotated about the pipe. Moreover, the pull-tension on the protector sheet may be adjusted in relation to the resistance to rotation of the roll carrier as governed by the friction brake therefor so that the desired pull-tension imposed on the wrapping material also may be maintained.

In typical use the machine with the aid of the C-shaped handles, is placed on the pipe to be wrapped after having manually manipulated the mechanism for lowering away the locking means so as to free the pipe-receiving mouths of the frame members. The locking means is then manually actuated to restore it to position for locking the pipe concentrically within the frame. The roll of selected pipe wrapping material is then put in place in the reel assembly and, if any adjustment is desired as regards the setting of the axis of rotation of the wheels 16 and the axis of rotation of the roll 39 of wrapping material about the axis of the arbor 38, it may be attended to at this time. The machine is now ready to pay out from the roll sufficient of the wrapping material to manually start its application to the pipe and at the same time the protector sheet may be started on the windup spool therefor. During this period of start-up the axis of rotation of the windup spool is adjusted by the means described so as to bring the axis of rotation of the windup spool essentially into parallelism with the axis of rotation of the roll of wrapping material. One also may adjust the wing nut 60 to adjust the tension imposed on the wrapping material by adjusting the spring load imposed on the friction clutch for the roll of wrapping material. Likewise by adjusting the wing nut 82 the tension imposed on the separator sheet 65 as it is stripped from the wrapping material and fed onto the windup spool may be adjusted. The application of the wrapping material about the pipe to form an overlapping spiral may now be instituted and continued by manually rotating the machine with the aid of the C-shaped handles about the pipe with concomitant forward travel of the machine until the roll of wrapping material is exhausted. Further application of the wrapping material merely requires the replacement of the exhausted roll with a fresh one. After the desired length of spiral wrapping applied along the pipe has been achieved, the locking means is manually actuated to lower the wheels 22, 22 out of the way so as to permit the lifting of the machine from the pipe.

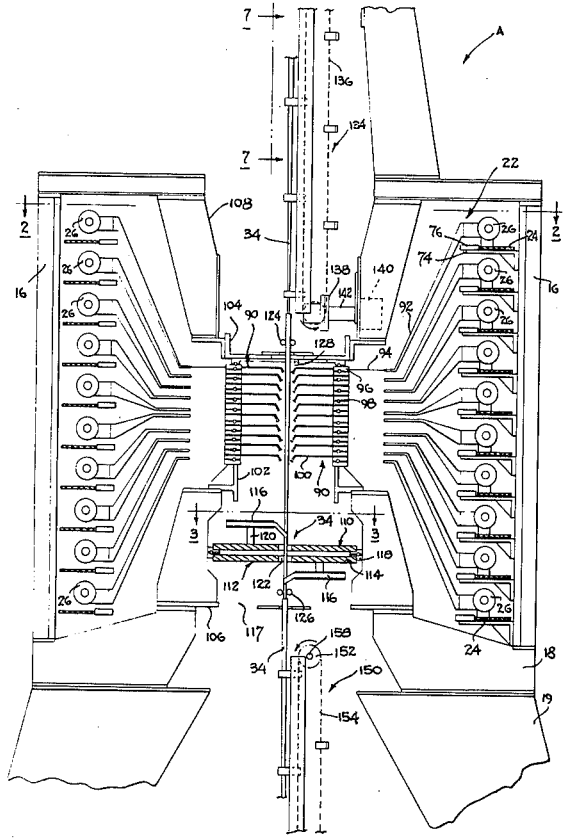

We claim:

1. In a portable pipe wrapping machine for wrapping a pipe manually which comprises a pipe enveloping frame having a pipe receiving mouth, locking means mounted on said frame for disposition across said pipe receiving mouth to retain a pipe therein, and means mounted on said frame for rotatably supporting said frame concentrically on a pipe, the improvement which comprises in combination roll carrier means adapted to receive thereon and support a roll of wrapping material preformed with a separator sheet that is strippable therefrom and that in said roll separates adjoining plies of said wrapping material from each other, means secured to said frame for rotatably mounting said roll carrier means with a roll of wrapping material carried thereby in position for feeding wrapping material from said roll onto said pipe during rotation of said frame about said pipe, adjustable friction brake means interposed between said frame and said roll carrier means for adjustably controlling resistance to rotation of said roll carrier means so as to thereby adjustably impose a predetermined tensile pull on wrapping material as it is removed from said roll and wrapped about said pipe responsive to said frame being rotated about said pipe, and a sheet receiving assembly mounted on said frame comprising a windup spool, means for rotatably mounting said windup spool in position for receiving to be wound thereon separator sheet stripped from said wrapping material as it is unwound from said roll carried by said roll carrier means and driving means comprising adjustable friction clutch means for rotating said spool responsive to rotation of said roll carrier means so as to maintain said protector sheet under a predetermined pull-tension as it is stripped from said wrapping material and wound up on said spool.

2. Apparatus according to claim 1 wherein said means for rotatably mounting said roll carrier means comprises an arbor secured to said frame the longitudinal axis of which is coaxial with the axis of rotation of said roll carrier means and wherein said adjustable friction brake means comprises a member presenting a radial face that faces said frame and that is rotatable about said arbor in fixed relation with respect to said roll carrier means, a member presenting a friction brake facing in opposed relation to said face of said member and that is longitudinally slidable along said arbor in non-rotatable relation therewith, a spring for urging said brake facing in frictional contact with said face presented by said member, and means for adjusting the spring load imposed by said spring.

3. A portable pipe wrapping machine according to claim 1 wherein said spool driving means comprises a first pulley mounted for rotation in fixed relation with respect to said roll carrier means, a second pulley mounted for rotation coaxially with respect to said windup spool, belt means for rotating said second pulley responsive to rotation of said first pulley, and friction clutch means interposed between said second pulley and said windup spool.

4. A portable pipe wrapping machine according to claim 3 wherein said friction clutch means comprises a face presented by said spool at the end thereof facing said frame, a clutch facing presented by said second pulley in opposed contacting relation to said face of said spool, means for mounting said second pulley not only for rotation with respect to said mandrel but also in longitudinally slidable relation with respect to said mandrel, and adjustable spring means for urging said clutch facing presented by said second pulley against said face of said spool.

5. A portable pipe wrapping machine according to claim 1 wherein said means for rotatably mounting said roll carrier comprises a block presenting a face that abuts the face of a frame member that is substantially normal to the axis of rotation of said frame, means for securing said block to said frame member in a plurality of rotational positions about an axis normal to said face of said block, an arbor the longitudinal axis of which coincides with the axis of rotation of said roll carrier means about said arbor, and means for securing the end of said arbor closest to said frame member to said block with its longitudinal axis out of line with said axis normal to the plane of said face of said frame member so that the angle that said arbor makes with respect to said frame member is adjustable responsive to rotation of said block.

6. A portable pipe wrapping machine according to claim 1 wherein said means for mounting said windup spool comprises a block presenting a face that abuts the face of a frame member that is substantially normal to the axis of rotation of said frame, means for securing said block to said frame member in each of a plurality of rotational positions about an axis normal to said face of said block, a mandrel the longitudinal axis of which coincides with the axis of rotation of said spool about said mandrel, and means for securing the end of said mandrel closest to said frame member to said block with its axis out of line with said axis normal to the plane of said face of said frame member so that the angle that said mandrel makes with respect to said frame member is adjustable responsive to rotation of said block.

7. A portable pipe wrapping machine according to claim 1 wherein said means for mounting said roll carrier means comprises an arbor which is secured to said frame and the longitudinal axis of which coincides with the axis of rotation of said roll carrier about said arbor and wherein said means for mounting said windup spool comprises a mandrel secured to said frame and the longitudinal axis of which coincides with the axis of rotation of said spool about said mandrel and means for adjusting the angle that said mandrel makes with respect to said frame so that the axis of rotation of said windup spool may be adjusted to position in parallelism with the axis of rotation of said roll carrier means.

8. A portable pipe wrapping machine according to claim 7 which also comprises means for adjusting the angle that the axis of rotation of said roll carrier means makes with a plane normal to the axis of rotation of said frame.

9. In a portable pipe wrapping machine for wrapping a pipe manually which comprises a pipe enveloping frame having a pipe receiving mouth, locking means mounted on said frame for disposition across said pipe receiving mouth to retain a pipe therein, and means mounted on said frame for rotatably supporting said frame concentrically on a pipe, the improvement which comprises in combination roll carrier means adapted to receive thereon and support a roll of wrapping material preformed with a separator sheet that is strippable therefrom and that in said roll separates adjoining plies of said wrapping material from each other, means secured to said frame for rotatably mounting said roll carrier means with a roll of wrapping material carried thereby in position for feeding wrapping material from said roll onto said pipe, a sheet receiving assembly mounted on said frame comprising a windup spool, means for mounting said windup spool in position for receiving to be wound thereon separator sheet stripped from said wrapping material as it is unwound from said roll carried by said roll carrier means, said mounting means including adjusting means for adjusting the axis of rotation of said spool to position of substantial parallelism relative to the axis of rotation of said roll carrier means and said adjusting means comprising a block presenting a face that abuts the face of a frame member that is substantially normal to the axis of rotation of said frame, means for securing said block to said frame member in each of a plurality of rotational positions about an axis normal to said face of said block, a mandrel the longitudinal axis of which coincides with the axis of rotation of said spool about said mandrel, and means for securing the end of said mandrel closest to said frame member to said block with its axis out of line with said axis normal to the plane of said face of said frame member so that the angle that said mandrel makes with respect to said frame member is adjustable responsive to rotation of said block.

10. A portable pipe wrapping machine according to claim 9 which also comprises means for adjusting the angle that the axis of rotation of said roll carrier means makes with a plane normal to the axis of rotation of said frame, said adjusting means comprising a block presenting a face that abuts a face of said frame member that is substantially normal to the axis of rotation of said frame, means for securing said block to said frame member in a plurality of rotational positions about an axis normal to said face of said block, an arbor the longitudinal axis of which coincides with the axis of rotation of said roll carrier means about said arbor, and means for securing the end of said arbor closest to said frame member to said block with its longitudinal axis out of line with said axis normal to the plane of said face of said frame member so that the angle that said arbor makes with respect to said frame member is adjustable responsive to rotation of said block.

* * * * *

United States Patent [19]

Goldsworthy

[11] 4,125,423
[45] Nov. 14, 1978

[54] REINFORCED PLASTIC TAPERED ROD PRODUCTS AND THE METHOD AND APPARATUS FOR PRODUCING SAME

[75] Inventor: William B. Goldsworthy, Palos Verdes Estates, Calif.

[73] Assignee: Goldsworthy Engineering, Inc., Torrance, Calif.

[21] Appl. No.: 687,148

[22] Filed: May 17, 1976

[51] Int. Cl.$^2$ .............................................. B65H 81/00
[52] U.S. Cl. ..................................... 156/428; 156/175; 156/432
[58] Field of Search ........ 156/195, 189, 425, 428–431, 156/173–175, 165, 166; 198/696; 138/144; 242/2, 7.21

[56] References Cited

U.S. PATENT DOCUMENTS

| 2,766,870 | 10/1956 | Baker et al. | 198/696 X |
|---|---|---|---|
| 2,823,154 | 2/1958 | Archer | 156/429 X |
| 3,032,461 | 5/1962 | Baker et al. | 156/432 X |
| 3,249,481 | 5/1966 | Boggs | 156/432 X |
| 3,457,962 | 7/1969 | Shobeut | 138/144 |
| 3,523,052 | 8/1970 | Bolen | 156/86 X |
| 3,549,454 | 12/1970 | Roberts | 156/431 |
| 3,567,542 | 3/1971 | Jackson | 156/172 |

*Primary Examiner*—David A. Simmons
*Attorney, Agent, or Firm*—Romney, Schaap, Golant, Scillieri, Disner & Ashen

[57] ABSTRACT

Reinforced plastic tapered tubular rod products and the method and apparatus for producing the same. Tapered steel mandrels of desired length and cross-sectional shape are connected in endwise alignment to form a continuously moving mandrel structure. The mandrels each have an enlarged head and a tapered nose at the opposite end thereof so that the nose extends into a recess formed in the enlarged head of the next proceeding mandrel. These mandrels are fed through a multiplicity of winding wheels in which filament containing strands issued from spools on the wheels are helically wound upon the mandrels. The winding wheels are individually programmable so that the geometry of the reinforcement can be varied ply by ply to obtain the desired longitudinal thickness and the desired torsional stiffness in the end product. The mandrels are held in their endwise connected alignment and retained between the winding wheels by an upper feeding mechanism in the form of an upper conveyor and a lower conveyor located respectively above and below the winding wheels. The lower sets of winding wheels are provided with shrink tapes which are wound about the outer surface of the reinforcement fibers applied to the reinforcement bands wound on the mandrels. The mandrels are thereafter separated from each other and in such manner that the reinforced plastic products which are resin impregnated and finally cured can be removed from the mandrels and thereupon used in the final end products.

23 Claims, 12 Drawing Figures